United States Patent [19]

Parmann

[11] 4,336,014
[45] Jun. 22, 1982

[54] SYSTEM FOR MOUNTING A FORMING ELEMENT ON A MANDREL

[75] Inventor: Gunnar Parmann, Alvøy, Norway

[73] Assignee: Rieber & Son A/S, Bergen, Norway

[21] Appl. No.: 187,495

[22] Filed: Sep. 15, 1980

[51] Int. Cl.³ ............................................. B29C 17/02
[52] U.S. Cl. ..................................... 425/403; 425/393; 425/DIG. 58; 425/DIG. 44; 425/DIG. 218; 29/450; 29/453
[58] Field of Search ...... 425/393, DIG. 218, DIG. 58, 425/403, 392; 29/453, 450

[56] References Cited

U.S. PATENT DOCUMENTS

| | | | |
|---|---|---|---|
| 3,377,659 | 4/1968 | Hucks | 425/392 |
| 3,998,578 | 12/1976 | Acda | 425/393 |
| 4,030,872 | 6/1977 | Parmann | 425/393 |
| 4,061,459 | 12/1977 | Parmann | 425/DIG. 218 |

Primary Examiner—J. Howard Flint, Jr.
Attorney, Agent, or Firm—Kenyon & Kenyon

[57] ABSTRACT

The mandrel uses a single anchoring groove in order to fixedly mount the forming and sealing element thereon for subsequent passage of a heated thermoplastic pipe end thereover. The forward wall of the anchoring groove may be directed radially outwardly or may be inclined rearwardly in order to abut the sealing portion of the element. The sealing portion fills the anchoring groove while the trailing wedge-shaped end fits into a small recess to avoid "fish-mouthing."

13 Claims, 5 Drawing Figures

SYSTEM FOR MOUNTING A FORMING ELEMENT ON A MANDREL

This invention relates to a system for anchoring a forming element on a mandrel.

Heretofore, it has been known to construct a pipeline from lengths of thermoplastic tubes which are joined together in end-to-end relation. It has also been known to shape one end of each thermoplastic tube to fit over an unshaped end of an adjacent tube and to provide a sealing gasket between the two ends of the tube to seal the joint therebetween. Various techniques have also been known for mounting a pipe forming element and sealing gasket on a mandrel and to thereafter pass a heated thermoplastic pipe end over the forming element to not only shape the pipe end but also to lock the forming element in the pipe. For example, U.S. Pat. No. 4,030,872 describes a technique wherein a combined annular mold element and sealing ring is mounted adjacent to a sleeve-shaped support ring on a drift or mandrel. After locating the support ring and the combined mold element and sealing ring, the end of a heated pipe is pushed over the drift, combined element and support ring into abutment with a shoulder on the support ring. Thereafter, the support ring is moved axially in a direction away from the pipe and enclosed combined element. This permits the heated pipe end to contact radially about the combined element.

It has also been known, for example as described in U.S. Pat. No. 4,030,872, to provide reinforcement in the combined mold element and sealing ring by means of a reinforcement hoop embedded in an elastic resilient body that constitutes the main mass of the combined element.

It is also known from applicant's copending application Ser. No. 956,376, filed Oct. 31, 1978, to mount an annular forming element on a mandrel having a plurality of parallel grooves with the sealing portion of the forming element squeezed into each of the grooves. In one embodiment, use is also made of an axially movable back-up collar to hold the forming element in place during passage of a heated end of a thermoplastic pipe over the element.

The use of a support ring or back-up collar, however, requires additional equipment and time in order to shape a heated pipe end and to mount a sealing gasket within the pipe end.

Accordingly, it is an object of this invention to eliminate the need for a back-up collar for mounting a forming and sealing element in place on a mandrel.

It is another object of the invention to simplify the equipment required for mounting a sealing element in a thermoplastic pipe.

It is another object of the invention to reduce the cost of mounting sealing elements in thermoplastic pipes.

Briefly, the invention provides an annular forming and sealing element and a mandrel having a single anchoring groove for mounting the element in place. The element includes a body of elastically yieldable material and a rigid relatively non-elastic annular ring within the body. The elastic body defines an annular sealing portion of a predetermined inner diameter on an interior surface and a trailing end of wedge-shaped cross-section while the rigid annular ring is disposed at least partially in a plane of the sealing portion.

The mandrel has a peripheral anchoring surface of an outer diameter greater than the diameter of the sealing portion of the forming and sealing element while the anchoring groove is located in the anchoring surface and is sized to receive the sealing portion of the forming and sealing element in deformed relation in order to anchor the element to the mandrel in fixed relation.

In accordance with the invention, the anchoring groove in the mandrel has an inner diameter greater than the inner diameter of the sealing portion of the forming and sealing element. Thus, when located in place, the sealing portion is deformed radially outwardly and fills the anchoring groove.

The mandrel may also include an annular recess in the anchoring surface for receiving the trailing end of the forming and sealing element in recessed manner. This annular recess is of an outer diameter greater than the outer diameter of the annular groove and is provided to avoid "fish-mouthing" of the trailing edge of the forming and sealing element during passage of a heated end of a thermoplastic pipe thereover.

The annular recess for the trailing end of the forming and sealing element may be axially spaced from the anchoring groove or may be contiguous to the anchoring groove. Also, a plurality of relatively small closely spaced micro-grooves may be located between the anchoring groove and the annular recess. These closely spaced micro-grooves, however, have an outer diameter greater than the outer diameter of the anchoring groove.

It has been found that the forming and sealing element can be securely anchored in place on the mandrel by the single anchoring groove of the mandrel without the need of a back-up collar. In this respect, it has been found that if the mandrel has more than one anchoring groove, the forming and sealing element with a minor reinforcing ring member such as a stell ring with a circular cross-section would become twisted and distorted should an attempt be made to move the element from one groove to the next groove. Thus, mandrels with more than one anchoring groove require forming and sealing elements with a steel band or similar reinforcement which can resist the twisting force during the assembly of the element on the mandrel.

The anchoring groove may be defined by a radially disposed forward annular wall, a coaxially disposed base and a rearwardly inclined rear annular wall. Alternatively, the anchoring groove may be defined by a rearwardly-inclined forward annular wall, a coaxially disposed base and a rearwardly-inclined rear annular wall.

The invention further provides a method of mounting a sealing element in a thermoplastic pipe. In accordance with the method, a mandrel is provided with a peripheral anchoring surface of predetermined outer diameter and a single anchoring groove. Thereafter, an annular forming and sealing element having a body of elastically yieldable material defining an inner annular sealing portion of an inner diameter less than the diameter of the anchoring surface as well as a rigid relatively non-elastic annular ring within the body at least partially in a plane of the sealing portion is moved onto the mandrel. The sealing portion of the element is then located in the anchoring groove of the mandrel in a deformed state with the sealing portion compressed against the anchoring groove. This serves to anchor the element of the mandrel in fixed relation whereby a heated thermoplastic pipe can thereafter be passed over the mandrel and the anchored element.

These and other objects and advantages of the invention will become more apparent from the following detailed description taken in conjunction with the accompanying drawings wherein.

Figure 1:
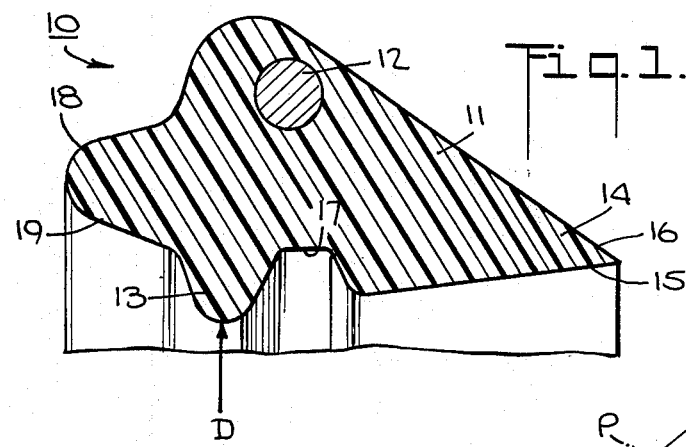
FIG. 1 illustrates a cross-sectional view of an annular forming and sealing element used in accordance with the invention.

Referring to FIG. 1, the annular forming and sealing element 10 includes a body 11 of elastically yieldable material and a rigid relatively non-elastic annular ring 12 of circular cross-section disposed within the body 11. The body 11 may be made, for example, of rubber, while the ring 12 is made of steel. The body has an annular sealing portion 13 of a predetermined inner diameter D on an interior surface as well as a trailing end 14 of wedge-shaped cross-section. As indicated, the trailing end 14 has an inner outwardly inclined tapering surface 15 and an outer inwardly inclined tapering surface 16 which form an apex at the end of the element 10. In addition, the element 11 has a recess 17 located between the sealing portion 13 and trailing end 14 which is of a diameter greater than the inner diameter D of the sealing portion 13 as well as a forward end 18 of a rounded conically-shaped cross-section. The forward end 18 has an inner surface 19 which extends from the sealing portion 13 and is of larger diameter than the inner diameter D.

The rigid ring 12 is disposed within the body 11 so that a portion of the ring 12 lies in the plane of the sealing portion 13. The remainder of the ring 12 lies in the plane of the recess 17.

The body 11 of the forming and sealing element 10 is of a shape similar to that of the forming element described in copending application Ser. No. 956,376 filed Oct. 31, 1978.

Figure 2:
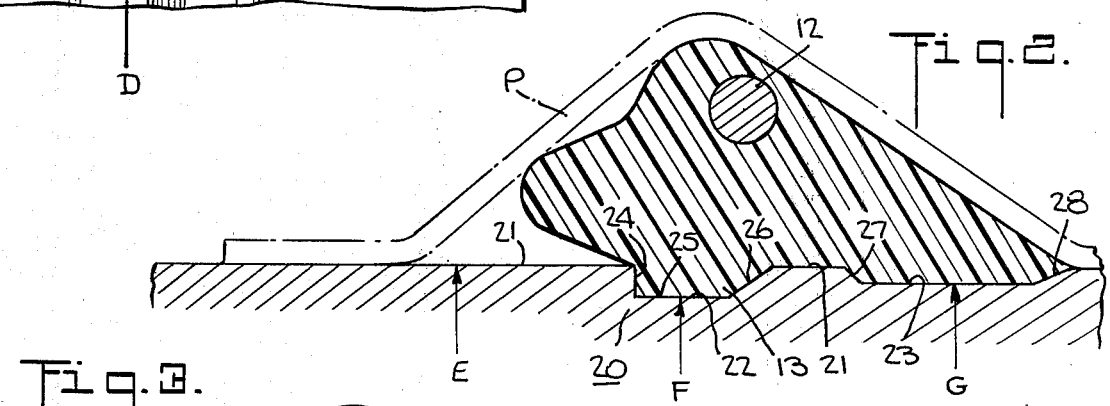
FIG. 2 illustrates the annular element of FIG. 1 mounted on a mandrel in accordance with the invention.

Referring to FIG. 2, the mandrel 20 is made, for example of steel, and has a peripheral anchoring surface 20 of predetermined outer diameter E. This diameter E is greater than the inner diameter D of the sealing portion 13 of the body 11. In addition, the surface 21 includes a single annular anchoring groove 22 and an annular recess 23. The anchoring groove 22 has an inner diameter F greater than the diameter D of the sealing portion 13 of the body 11 while the recess 23 has a diameter G greater than the diameter F of the anchoring groove 22 but slightly less than the diameter E of the anchoring surface 21.

The anchoring groove 22 of the mandrel 20 is sized to receive the sealing portion 13 of the forming and sealing element 10 in a deformed relation such that the sealing portion 13 fills the groove 22. The recess 23 is sized so as to receive the trailing end 14 of the element 10 in order to avoid "fish-mouthing" when a heated pipe end is subsequently passed over the mandrel 20 and element 10.

As shown in FIG. 2, the anchoring groove 22 has a sharply defined radially disposed forward annular wall 24, a coaxially disposed base 25 and a rearwardly inclined rear annular wall 26. The length of the groove 22 from the wall 24 to the end of the rear wall 26 is slightly larger than the width of the sealing portion 13 of the forming and sealing element 10. Thus, when the sealing portion 13 is deformed radially outwardly when placed in the groove 22, the anchoring groove 22 can be filled by the deformed sealing portion 13.

The annular recess 23 has an inclined forward wall 27 and an inclined rear wall 28. These walls 27, 28 are sloped a sufficient amount to allow the sealing portion 13 of the element 10 to slide through the recess 23.

In order to mount the forming and sealing element 10 on the mandrel 20, the element is slid over the mandrel from the right as viewed in FIG. 2 along the anchoring surface 21 and through the recess 23 until becoming seated in the anchoring groove 22. During passage along the peripheral anchoring surface 21, the sealing portion 13 of the element 10 is deformed radially outwardly. Upon moving into the anchoring groove 22, the sealing portion 13 remains deformed radially due to the difference in the diameters D, F. At the same time, the deformed sealing portion 13 abuts against the forward wall 24 of the anchoring groove 22 so as to preclude further forward motion along the mandrel 20. At this time, the deformed portion 13 fills the anchoring groove 22. In this condition, the trailing end 14 is seated in the annular recess 23 with the apex thereof disposed below the plane of the anchoring surface 21. Thereafter, a heated end of a thermoplastic pipe P can be slid from the right, as viewed, over the anchoring surface 21 and element 10. In this regard, the heated end of the thermoplastic pipe P slides upwardly in a radially outwardly deformed manner along the surface 16 of the trailing end 14 of the body 11 and subsequently passes downwardly in a radially inwardly deformed manner over the forward end 18 of the element 10 until again coming in contact with the anchoring surface 21 of the mandrel 20. After cooling of the pipe end, the mandrel 20 can be removed by moving to the left as shown in FIG. 2 relative to the pipe and element 10. During this time, the deformed sealing portion 13 of the body 11 moves along the rear wall 26 of the anchoring groove 22 and subsequently through the recess 23 to permit removal of the mandrel 20. In this regard, note is made that the mandrel 20 may be pulled out of the pipe P or the pipe P and enclosed element 10 can be pulled off the mandrel 20.

Figure 3:
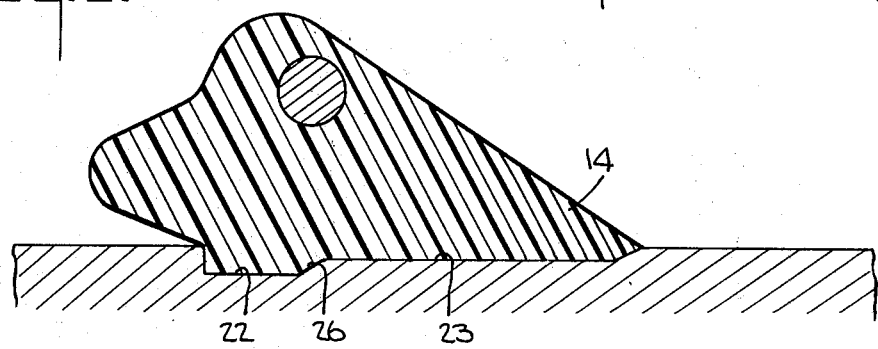
FIG. 3 illustrates an annular element of FIG. 1 mounted on a modified mandrel in accordance with the invention.

Referring to FIG. 3, wherein like reference characters indicate like parts as above, the annular recess 23' for the trailing end 14 of the element 10 may be located in contiguous relation to the anchoring groove 22. In this case, the recess 23 does not have a forward wall.

Figure 4:
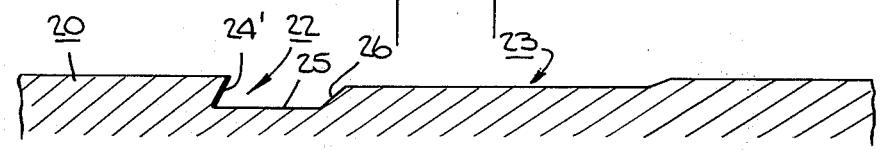
FIG. 4 illustrates a further modified mandrel in accordance with the invention.

Referring to FIG. 4, wherein like reference characters indicate like parts as above, the anchoring groove 22 may have a sharply defined rearwardly inclined forward annular wall 24'. Such a wall 24' serves to further preclude advancement of the element 10 along the mandrel 20 during mounting.

Figure 5:
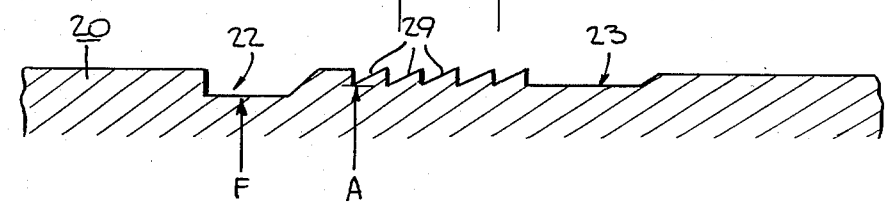
FIG. 5 illustrates a further modified mandrel having micro-grooves between an annular recess and an anchoring groove in accordance with the invention.

Referring to FIG. 5, wherein like reference characters indicate like parts as above, the mandrel 20 may be provided with a plurality of relatively small closely-spaced grooves or microgrooves 29 between the anchoring groove 22 and the recess 23. As illustrated, these micro-grooves 29 are of triangular cross-sectional shape and are formed by serrations in the mandrel 20. Each of these grooves 29 also has an outer diameter H greater than the diameter F of the anchoring groove 22.

Referring to FIG. 2, as a numerical example of the element 10 and mandrel 20 which can be used, the mandrel 21 has an outer diameter of 161.7 millimeters. The anchoring groove 22 has a diameter F of 160 millimeters while the length of the base 22 is 7.5 millimeters and the overall length from the wall 24 to the end of the wall 26 is 9 millimeters. The annular recess 23 has a diameter G of 160.8 millimeters and an axial length of 10.5 millimeters. The element 10 as shown in FIG. 1 has an inner diameter D of 155 millimeters, a recess 17 having a diameter of 164 millimeters and an overall length as viewed from the tip of the forward end 18 to the apex of the trailing end 14 of 32 millimeters. Also, the outer diameter of the element 10 has a diameter of 185 millimeters. The rigid ring 12 has a cross-section of a diameter of 3.5 millimeters and is located with the central axis at a radius of 88 millimeters from the axis of the mandrel 20. Further, the ring 12 projects about 1.5 millimeters into the plane of the anchoring groove 22.

The above dimensions are suitable for mounting the element 10 in a thermoplastic pipe having an outside diameter of 160.4±0.4 millimeters with a thickness of 8 millimeters.

As a general recommendation, the diameter of the anchoring groove 22 shall be approximately equal to the minimum diameter of the pipe (i.e. the spigot) and the diameter of the anchoring groove 23 shall be approximately equal to the maximum diameter of the pipe (i.e. spigot). The difference between the diameter F of the anchoring groove 23 and the minimum diameter D of the reinforced rubber gasket is approximately 30% to 50% of the radial cross-sectional thickness of the gasket. The total length of the grooved area is approximately 1.8 times the radial cross-sectional thickness of the gasket.

The radial cross-sectional thickness of the gasket, depending on the type of pipe e.g. pressure, sewer, etc., will have values between:

(0.05 d+10 mm.) and (0.02 d+5 mm.) where "d" is the diameter of the pipe (i.e. the spigot) in millimeters.

What is claimed is:

1. In combination
   an annular forming and sealing element including a body of elastically yieldable material defining an annular sealing portion having an inner diameter on an interior surface thereof and a trailing end of a wedge-shaped cross-section, and a rigid relatively non-elastic annular ring of circular cross-section disposed within said body at least partially in a plane of said sealing portion; and
   a mandrel having said element mounted thereon, said mandrel having a peripheral anchoring surface of an outer diameter greater than said inner diameter of said sealing portion and including one annular anchoring groove therein sized to receive said sealing portion therein in deformed relation to anchor said element to said mandrel in fixed relation, said groove having a sharply defined forward annular wall abutting said sealing portion to preclude advancement of said element along said mandrel.

2. The combination as set forth in claim 1 wherein said anchoring groove has an inner diameter greater than said diameter of said sealing portion.

3. The combination as set forth in claim 1 wherein said mandrel includes an annular recess in said anchoring surface receiving said trailing end therein in recessed manner, said annular recess being of greater outer diameter than said outer diameter of said anchoring groove.

4. The combination as set forth in claim 3 wherein said annular recess is contiguous to said anchoring groove.

5. The combination as set forth in claim 3 wherein said annular recess is axially spaced from said anchoring groove.

6. The combination as set forth in claim 5 wherein said anchoring surface has a plurality of relatively small closely-spaced grooves between said anchoring groove and said annular recess, said closely spaced grooves having an outer diameter greater than said outer diameter of said anchoring groove.

7. The combination as set forth in claim 1 wherein said forward annular wall is radially disposed and said anchoring groove has a co-axially disposed base and a rearwardly inclined rear annular wall.

8. The combination as set forth in claim 1 wherein said forward annular wall is rearwardly inclined and said anchoring groove has a co-axially disposed base and a rearwardly inclined rear annular wall.

9. The combination as set forth in claim 1 wherein said anchoring groove is of a co-axial width smaller than the co-axial width of said sealing portion.

10. The combination as set forth in claim 1 wherein said annular ring is located wholly within said plane of said sealing portion.

11. The combination as set forth in claim 10 wherein said annular ring is made of steel.

12. In a method of mounting a sealing element in a thermoplastic pipe, the steps of
    providing a mandrel having a peripheral anchoring surface with an outer diameter with a single anchoring groove therein having a sharply defined annular forward wall to preclude advancement of the element;
    moving an annular forming and sealing element onto the mandrel, said element having a body of elastically yieldable material defining an inner annular sealing portion of an inner diameter less than said outer diameter and a rigid relatively non-elastic annular ring of circular cross-section within said body at least partially in a plane of said sealing portion; and
    locating said sealing portion of said element in said anchoring groove of said mandrel in a deformed state with said sealing portion filling said anchoring groove and abutting said forward wall to anchor said element to said mandrel in fixed relation whereby a heated thermoplastic pipe can be passed over said mandrel and said anchoring element.

13. In combination
    an annular forming and sealing element including a body of elastically yieldable material defining an annular sealing portion having an inner diameter on an interior surface thereof and a trailing end of wedge-shaped cross-section and a rigid relatively non-elastic annular ring disposed within said body at least partially in a plane of said sealing portion; and
    a mandrel having said element mounted thereon, said mandrel having a peripheral anchoring surface of an outer diameter greater than said diameter of said sealing portion and including one annular anchoring groove therein sized to receive said sealing portion therein in deformed relation to anchor said element to said mandrel in fixed relation, an annular recess therein spaced from said anchoring groove and receiving said trailing end in recessed manner, said annular recess being of greater outer diameter than said outer diameter of said anchoring groove, and a plurality of relatively small closely-spaced grooves between said anchoring groove and said annular recess, said closely-spaced grooves having an outer diameter greater than said outer diameter of said anchoring groove.

* * * * *